(12) United States Patent
Madabhushi et al.

(10) Patent No.: US 9,430,829 B2
(45) Date of Patent: Aug. 30, 2016

(54) AUTOMATIC DETECTION OF MITOSIS USING HANDCRAFTED AND CONVOLUTIONAL NEURAL NETWORK FEATURES

(71) Applicant: Case Western Reserve University, Cleveland, OH (US)

(72) Inventors: Anant Madabhushi, Beachwood, OH (US); Haibo Wang, Cleveland Heights, OH (US); Angel Cruz-Roa, Bogota (CO); Fabio Gonzalez, Bogota (CO)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 14/562,883

(22) Filed: Dec. 8, 2014

(65) Prior Publication Data

US 2015/0213302 A1    Jul. 30, 2015

Related U.S. Application Data

(60) Provisional application No. 61/933,409, filed on Jan. 30, 2014.

(51) Int. Cl.
*G06K 9/00* (2006.01)
*G06K 9/38* (2006.01)
*G06T 7/00* (2006.01)
*G06K 9/62* (2006.01)

(52) U.S. Cl.
CPC .......... *G06T 7/0012* (2013.01); *G06K 9/00147* (2013.01); *G06K 9/6281* (2013.01); *G06T 2207/10056* (2013.01); *G06T 2207/20081* (2013.01); *G06T 2207/20084* (2013.01); *G06T 2207/30024* (2013.01); *G06T 2207/30068* (2013.01)

(58) Field of Classification Search
None
See application file for complete search history.

(56) References Cited

U.S. PATENT DOCUMENTS

| 2007/0112701 | A1* | 5/2007 | Chellapilla | G06K 9/6256 706/15 |
| 2007/0140556 | A1* | 6/2007 | Willamowski | G06K 9/0061 382/167 |
| 2010/0002920 | A1* | 1/2010 | Cosatto | G06K 9/00147 382/128 |
| 2010/0172568 | A1* | 7/2010 | Malon | G06K 9/00147 382/133 |
| 2014/0139625 | A1* | 5/2014 | Mathuis | G03H 1/0005 348/40 |
| 2014/0314292 | A1* | 10/2014 | Kamen | A61B 6/463 382/131 |

* cited by examiner

*Primary Examiner* — Nirav G Patel
*Assistant Examiner* — Brian Shin
(74) *Attorney, Agent, or Firm* — Eschweiler & Associates, LLC

(57) ABSTRACT

One example apparatus associated with detecting mitosis in breast cancer pathology images by combining handcrafted (HC) and convolutional neural network (CNN) features in a cascaded architecture includes a set of logics that acquires an image of a region of tissue, partitions the image into candidate patches, generates a first probability that the patch is mitotic using an HC feature set and a second probability that the patch is mitotic using a CNN-learned feature set, and classifies the patch based on the first probability and the second probability. If the first and second probabilities do not agree, the apparatus trains a cascaded classifier on the CNN-learned feature set and the HC feature set, generates a third probability that the patch is mitotic, and classifies the patch based on a weighted average of the first probability, the second probability, and the third probability.

20 Claims, 6 Drawing Sheets

AUTOMATIC DETECTION OF MITOSIS USING HANDCRAFTED AND CONVOLUTIONAL NEURAL NETWORK FEATURES

CROSS REFERENCE TO RELATED APPLICATIONS

This application claims the benefit of U.S. Provisional Application 61/933,409 filed Jan. 30, 2014.

FEDERAL FUNDING NOTICE

The invention was made with government support under Federal Grant Numbers R01CA1364435-01, R01CA140772-01, NIH 1R21CA179327-01A1 and R21CA167811-01 awarded by the National Cancer Institute of the National Institutes of Health, award number R01DK098503-02 provided by the National Institute of Diabetes and Digestive and Kidney Diseases, the DOD Prostate Cancer Synergistic Idea Development Award PC120857, and DOD CDMRP Lung Cancer Research Idea Development Award New Investigator LC130463. The government has certain rights in the invention.

BACKGROUND

Breast cancer (BCa) grading plays an important role in predicting disease aggressiveness and patient outcome. Bloom Richardson grading is the most commonly used grading system for histopathologic diagnosis of invasive BCa. A key component of Bloom Richardson grading is mitotic count. Mitotic count, which refers to the number of dividing cells (e.g., mitoses) visible in a given area of hematoxylin and eosin (H&E) stained images, is an effective predictor of disease aggressiveness. Clinically, mitotic count is the number of mitotic nuclei identified visually in a fixed number of high power fields (HPF). Conventionally, mitotic nuclei are identified manually by a pathologist. Manual identification of mitotic nuclei suffers from poor inter-interpreter agreement due to the variable texture and morphology between mitoses. Manual identification is also a resource intensive and time consuming process that involves a trained pathologist manually inspecting and counting cells viewed in an HPF under a microscope. Manual identification is not optimal when trying to bring treatments to bear on a patient as quickly as possible in a clinically relevant timeframe.

Computerized detection of mitotic nuclei attempts to increase the speed, accuracy, and consistency of mitotic identification. However, the detection of mitotic nuclei in an H&E stained slide is a challenging task for an automated system. During mitosis, the cell nucleus undergoes various morphological transformations that lead to highly variable sizes and shapes across mitotic nuclei within the same image. Automated detection of mitotic nuclei is further complicated by rare event detection. Rare event detection complicates classification when one class (e.g., mitotic nuclei) is substantially less prevalent than the other class (e.g., non-mitotic nuclei).

Conventional approaches to computerized mitotic detection that employ manual annotation of candidate regions by an expert pathologist offer only limited improvements over manual detection, and still suffer from the problem of inter-interpreter disagreement. Some conventional approaches to computerized mitotic detection that try to minimize reliance on a human pathologist may employ machine learning techniques. For example, some conventional approaches to computerized mitotic detection feature machine learning systems and methods. These systems and methods employ convolutional neural networks (CNN) to identify features and assist in mitotic detection. However, conventional CNN methods are computationally demanding. For example, one conventional method for mitotic detection employs an eleven-layered CNN. Since each layer is comprised of hundreds of units, this conventional method takes several days to analyze an image. Other conventional methods that employ CNN may take several weeks to train and test a classifier. Several weeks may be a sub-optimal time frame when administering timely treatment to a patient suffering from an aggressive form of cancer.

Conventional methods of automatic mitotic detection may employ handcrafted (HC) features. HC features identified by conventional techniques include various morphological, statistical, and textural features that attempt to model the appearance of mitosis in digitized images. However, while HC-feature-based classifiers may be faster than CNN-based classifiers, conventional HC feature-based classifiers are not as accurate as CNN-based classifiers, and fail to identify some features that CNN-based classifiers may detect. Conventional HC-based classifiers are highly dependent on the evaluation dataset used to train the HC-based classifier. Furthermore, HC-based classifiers lack a principled approach for combining disparate features. Thus, conventional CNN-based classification systems and methods of automatic mitotic detection are computationally intensive and may operate in time frames that are not optimal for clinical relevance when diagnosing patients (e.g., days or weeks instead of hours or minutes). Conventional HC-based classifiers, while faster than CNN-based classifiers, are not as accurate as CNN-based classifiers, suffer from a strong dependence on the training dataset, and are not optimally suited for combining disparate features.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
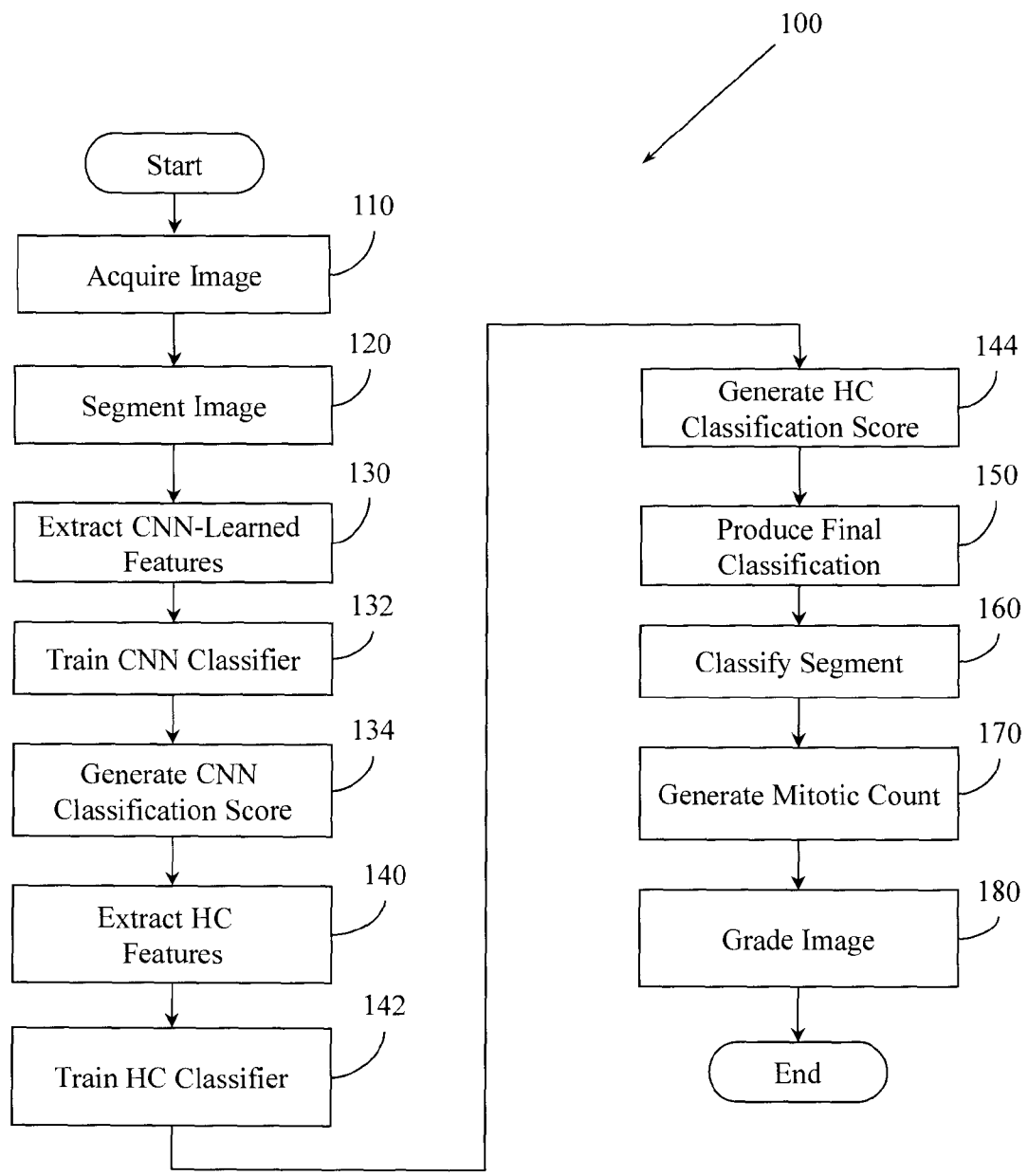
FIG. 1 illustrates an example method of detecting cellular mitosis in a region of cancerous tissue.

Breast cancer (BCa) grading is an important tool in predicting cancer aggressiveness and patient outcome. Bloom-Richardson grading is the most commonly used method of BCa grading. Mitotic count is a key component of Bloom-Richardson BCa grading. Mitotic count involves quantifying the number of cells undergoing mitosis at a specific point in time in a specific region. Conventionally, mitotic count is determined by a human pathologist visually identifying mitotic nuclei in a fixed number of high power fields of H&E stained histopathology images. Manual identification suffers from poor inter-interpreter agreement due to the highly variable texture and morphology between mitoses. Manual identification is also laborious, expensive, and time consuming.

Conventional approaches to automated mitosis detection have been either HC feature based, or feature learning based. Commonly used HC features include various morphological, statistical, and textural features that attempt to model the appearance of the domain and in particular the appearance of mitoses within digitized images. While domain inspired (e.g., handcrafted) approaches allow for explicit modeling of features that human pathologists look for when identifying mitoses, HC feature based approaches still depend heavily on the evaluation dataset when identifying salient features. HC feature based approaches also lack a principled approach for combining disparate features.

Feature learning based approaches may employ CNNs. In contrast to HC feature based approaches, CNN based approaches are fully data driven. CNNs are multi-layer neural networks that learn a bank of convolutional filters at different layers. CNN-based approaches identify mitotic nuclei more accurately than HC feature based approaches, and are able to find feature patterns that HC features fail to describe. However, CNN approaches are computationally demanding and are sensitive to scalability of the training data. For example, conventional CNN-based approaches may use eleven or more layers to achieve a clinically useful level of accuracy. Conventional eleven layer CNNs require at least thirty epochs for training. While a useful level of accuracy may be achieved, it is not achieved in a clinically relevant timeframe, since each layer of a conventional eleven-layer model includes hundreds of units and requires several weeks for training and testing.

One conventional method of automated mitosis detection includes stacking a CNN-learned feature set with an HC feature set. (C. Malon and E. Cosatto, "Classification of mitotic figures with Convolutional Neural Networks and seeded blob features," *Journal of Pathology Informatics* 4(1), 9 (2013)) (NEC). The NEC approach performed classification via the CNN features and HC features together. The NEC approach of stacking the CNN features and HC features together biased the classifier towards the feature set with the larger number of attributes, leading to a sub-optimal accuracy. The NEC approach also failed to capture attributes of mitotic nuclei in relation to their local context.

Example methods and apparatus detect mitosis through classifying regions of an image of cancerous tissue as mitotic or non-mitotic. Example methods and apparatus employ a cascaded approach when combining CNN features and HC features in automated mitosis detection. Example methods and apparatus perform classification with CNN features and HC features separately. Example methods and apparatus use a combined CNN and HC feature set for classification when confronted with confounding images. By employing a cascaded approach, example methods and apparatus are less prone to biasing the classifier towards the feature set with the larger number of attributes. In one embodiment, a three-layer CNN operates on at least an 80 pixel by 80 pixel patch size. HC features are extracted from a region of clusters of segmented nuclei that, in one embodiment, is less than or equal to 30 pixels by 30 pixels. Example methods and apparatus compute attributes of not only mitotic nuclei, but also of the local context for the mitotic nuclei. The local context around candidate mitoses facilitates correctly identifying mitosis. Conventional methods fail to capture local context.

Example methods and apparatus segment likely candidate mitosis regions from an image of cancerous tissue. Segmenting the image triages the image by removing obviously non-mitotic regions. Removing obviously non-mitotic regions reduces the computing resources, electricity, and time required to analyze an image of cancerous tissue. Time and resources are not wasted by analyzing regions that are obviously non-mitotic. Example methods and apparatus extract from the candidate mitosis regions a CNN-learned feature set and an HC feature set. The CNN-learned feature set and the HC feature set are extracted independently of each other. Example methods and apparatus construct independently trained classifiers using the HC feature set and the CNN-learned feature set. The HC trained classifier is trained on the HC feature set independently of the CNN trained classifier. The CNN trained classifier is trained on the CNN-learned feature set independently of the HC trained classifier.

Example methods and apparatus classify the candidate mitosis region. The CNN trained classifier classifies the candidate mitosis region independently, and the HC trained classifier classifies the candidate mitosis region independently. Example methods and apparatus employ a light CNN model in which the CNN has at least three layers. Example methods and apparatus classify the candidate region based on a probability the region is mitotic. The CNN trained classifier calculates a probability that a candidate mitosis region is mitotic. If the probability exceeds a threshold probability, the CNN trained classifier classifies the candidate region as mitotic. If the probability is equal to or less than the threshold probability, the CNN trained classifier classifies the candidate mitosis patch as non-mitotic. Independent of the CNN trained classifier, the HC trained classifier also calculates a probability that the candidate mitosis region is mitotic. If the probability exceeds a threshold probability, the HC trained classifier classifies the candidate region as mitotic. If the probability is equal to or less than the threshold probability, the HC trained classifier classifies the candidate mitosis patch as non-mitotic. If the HC trained classifier and the CNN trained classifier agree that the candidate mitosis region is mitotic, example methods and apparatus classify the candidate mitosis region as mitotic. If the HC trained classifier and the CNN trained classifier agree that the candidate mitosis region is non-mitotic, example methods and apparatus classify the candidate region as non-mitotic.

Example methods and apparatus classify the candidate mitosis region with a third, cascaded classifier when the HC trained classifier and the CNN trained classifier disagree in their classifications of the candidate mitosis region. For example, if the HC trained classifier classifies the candidate mitosis region as non-mitotic, while the CNN trained classifier classifies the candidate mitosis region as mitotic, the third classifier will classify the region. The third classifier is trained using a stacked feature set that is based on the HC feature set and the CNN feature set. The third classifier may be a second-stage Random Forests classifier. The third classifier calculates a probability that the candidate mitosis region is mitotic. Example methods and apparatus generate a final classification for the candidate mitosis region based on a weighted average of the outputs of the HC classifier, the CNN classifier, and the cascaded classifier. Example methods and apparatus thus improve on conventional approaches to automated mitosis detection by employing a cascaded approach to the combination of CNN and HC features, by learning multiple attributes that characterize mitosis based on the combination of CNN and HC features, and by achieving a highly accurate level of mitosis detection while minimizing the computing resources and time required. Example methods and apparatus identify mitotic nuclei with an F-measure of 0.7345 faster than conventional methods.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a computerized method 100 of detecting cellular mitosis in a region of cancerous tissue using a cascaded approach that combines a CNN model with hand-crafted features. Method 100 includes, at 110, acquiring an image of a region of cancerous tissue. Accessing an image includes acquiring electronic data, reading from a computer file, receiving a computer file, reading from a computer memory, or other computerized activity. In one embodiment, the image is an RGB (red green blue) color space image, and the image has dimensions of at least 2084 pixels×2084 pixels. In one embodiment, the image may be acquired by scanning the image from a high power field (HPF) of a hematoxylin and eosin (H&E) stained tissue slide. The HPF represents at least a 512×512 μm region of tissue. In this embodiment, the HPF is acquired using a slide scanner and a multi-spectral microscope. The slide-scanner may be, for example, an Aperio XT scanner with a resolution of 0.2456 μm per pixel. In other embodiments, the image may have different dimensions and may be acquired from other systems, including a microscope or an electron microscope. In still other embodiments, the HPF may represent a region of tissue with dimensions other than 512×512 μm.

Method 100 also includes, at 120, segmenting the image into at least one candidate mitosis patch. In one embodiment, segmenting the image into at least one candidate mitosis patch includes generating a blue-ratio image by converting the image from RGB color space to blue-ratio color space. Method 100 assigns a higher value to a pixel with a high blue intensity relative to the pixel's red and green components. Assigning a higher value to a pixel with a high blue intensity allows method 100 to highlight nuclei regions. Method 100, at 120, also computes a Laplacian of Gaussian (LoG) response of the blue-ratio image to discriminate the nuclei region of the candidate mitosis patch from the background. Method 100, also at 120, identifies a candidate nuclei. Candidate nuclei are identified by integrating globally fixed thresholding and local dynamic thresholding. By segmenting the image into at least one candidate mitosis patch, method 100 creates the technical effect of triaging the image by removing regions that are highly unlikely to be mitotic. Method 100 may thus reduce the amount of computing resources and time required to analyze the image compared to conventional approaches.

Method 100 also includes, at 130, extracting a set of CNN-learned features from the candidate mitosis patch. To extract the set of CNN-learned features, method 100 employs a convolutional neural network (CNN). Unlike conventional methods that employ multi-layer CNNs that may take days or weeks to train and test, method 100 employs a light CNN model that has fewer layers than conventional methods. In one embodiment, the architecture of the CNN model includes three layers. The first layer is a convolutional-pooling layer that includes a first convolution layer and a first pooling layer. The first convolution layer has at least P units, where P is a number. A first pooling layer is connected to the first convolution layer. The first pooling layer has at least Q units, where Q is a number. The second layer is also a convolutional-pooling layer. The second layer includes a second convolutional layer and a second pooling layer. The second convolutional layer is connected to the first pooling layer and has at least X units, where X is a number greater than P and greater than Q. The second layer also includes a second pooling layer connected to the second convolutional layer. The second pooling layer has at least Y units, where Y is a number greater than P and greater than Q. The third layer is a fully-connected layer that is connected to the second pooling layer. The fully-connected layer has Z units, where Z is a number greater than Y. The CNN is connected to an output layer connected to the fully-connected layer. The output layer has at least two output units. The first output unit, when activated, indicates a mitosis classification. The second output unit, when activated, indicates a non-mitosis classification. In another embodiment, the first output unit indicates non-mitosis, and the second output unit indicates mitosis. In other embodiments, the CNN may include different numbers of layers.

In one embodiment, P is at least 64, Q is at least 64, X is at least 128, Y is at least 128, and Z is at least 256. For example, the first convolution layer has at least 64 units, and the first pooling layer has at least 64 units. The second convolution layer has at least 128 units, and the second pooling layer has at least 128 units. The fully connected layer has at least 256 units. In other embodiments, the layers may have other numbers of units. For example, the first convolution layer and first pooling layer may each have 32 units, the second convolution layer and the second pooling layer may each have 64 units, and the fully-connected layer may have 128 units.

Method 100 also includes, at 132, training a CNN classifier using the set of CNN-learned features. Training the CNN classifier using the set of CNN-learned features includes generating a rotated mitosis patch by rotating the candidate mitosis patch. Training the CNN classifier also includes generating a mirrored mitosis patch by mirroring the candidate mitosis patch. Generating a rotated mitosis patch and a mirrored mitosis patch addresses the class-imbalance problem associated with conventional approaches, and also achieves rotational invariance. Method 100, also at 132, computes a log-likelihood that the candidate mitosis patch is mitotic. To compute the log-likelihood, method 100 minimizes a loss function by training the CNN classifier using the rotated mitosis patch, the mirrored mitosis patch, and the candidate mitosis patch. The CNN classifier is trained on the patches using Stochastic Gradient Descent. The loss function is defined as $$L(x) = -\log\left[\frac{e^{x_i}}{\sum_j e^{x_j}}\right],$$

where $x_i$ corresponds to the output of the fully-connected layer multiplied by a logistic model parameter. The output of the CNN, in the form of the log-likelihood that the candidate patch is mitotic, is thus the log-likelihood of class membership. A first class may represent mitotic nuclei, and a second class may represent non-mitotic nuclei. In other embodiments, other classes may be defined.

Method 100, at 134, generates a CNN classification score by classifying the candidate mitosis patch with the CNN classifier trained at step 132. Method 100, at 134, computes the probability that the candidate mitosis patch is mitotic. In one embodiment, method 100 computes the probability that the candidate mitosis patch is mitotic by applying an exponential function to the log-likelihood that the candidate patch is mitotic. Applying an exponential function to the log-likelihood results in a probability that a candidate mitosis patch is mitotic expressed as a real number between 0 and 1. Method 100, also at 134, assigns the probability that the candidate mitosis patch is mitotic to the CNN classification score. Method 100, also at 134, determines whether the probability that the candidate mitosis patch is mitotic is greater than a CNN threshold probability. If method 100 determines that the probability the candidate mitosis patch is greater than the CNN threshold, method 100 classifies the candidate mitosis patch as mitotic. If method 100 determines that the probability that the candidate mitosis patch is mitotic is less than or equal to the CNN threshold, method 100 classifies the candidate mitosis patch as non-mitotic. In one embodiment, the threshold probability is at least 0.58. In other embodiments, other threshold embodiments may be employed.

Method 100 also includes, at 140, extracting a set of handcrafted (HC) features from the candidate mitosis patch. In one embodiment, the set of HC features extracted from the candidate mitosis patch includes a set of morphology features, a set of intensity features, and a set of texture features. In other embodiments, other sets of HC features may be extracted.

In one embodiment, at 140, method 100 generates a binary mask of the candidate mitosis patch by applying blue-ratio thresholding and local non-maximum suppression to the candidate mitosis patch. Method 100 then extracts the set of morphology features from the binary mask of the candidate mitosis patch. The set of morphology features represent various attributes of mitosis shape. In one embodiment of method 100, the set of morphology features extracted from the candidate mitosis patch includes area, eccentricity, equivalent diameter, Euler number, extent, perimeter, solidity, major axis length, minor axis length, area overlap ratio, average radial ratio, compactness, Hausdorff dimension, smoothness, or standard distance ratio. In another embodiment, other morphology features may be extracted.

Method 100 also includes, at 140, extracting the set of intensity features from a set of channels of the candidate mitosis patch. In one embodiment, the set of channels includes a blue-ratio channel, a red channel, a blue channel, a green channel, an L channel in LAB color space, a V channel in CIE 1976 (L*, u*, v*) (LUV) color space, or an L channel in LUV color space. The set of intensity features includes mean intensity, median intensity, variance, maximum/minimum ratio, range, interquartile range, kurtosis, or skewness. In another embodiment, the set of intensity features may be extracted from different channels, and the set of intensity features may include different intensity features.

Method 100, also includes, at 140, extracting the set of texture features from a set of channels of the candidate mitosis patch. In one embodiment, the set of channels includes a blue-ratio channel, a red channel, a blue channel, a green channel, an L channel in LAB color space, a V channel in CIE 1976 (L*, u*, v*) (LUV) color space, or an L channel in LUV color space. The set of texture features includes a subset of concurrence features and a subset of run-length features. The subset of concurrence features includes the mean and standard deviation of thirteen Haralick gray-level concurrence features obtained from the candidate mitosis patch. The thirteen Haralick gray-level concurrence features are obtained from the candidate mitosis patch at four orientations. The subset of run-length features includes the mean and standard deviation of a set of gray-level run-length matrices. The set of gray-level run-length matrices also corresponds to four orientations. In another embodiment, a different set of texture features may be extracted, or a different set of channels may be used.

In one embodiment of method 100, the dimensionality of the set of HC features is reduced. In this embodiment, the dimensionality of the set of HC features extracted at step 140 is 253, including 15 morphology features, 56 intensity features corresponding to the set of 8 morphology features extracted from 7 different channels, and 182 texture features. The 182 texture features correspond to the mean and standard deviation extracted from 13 Haralick gray-level concurrence features obtained at four dimensions, and the mean and standard deviation of gray-level run-length matrices obtained in four dimensions. The dimensionality of the set of HC features is reduced using principal component analysis (PCA) or minimum redundancy feature selection (mRMR). An optimal set of features is selected from the reduced-dimensionality set of HC features. In one embodiment, if PCA is employed, the optimum set of HC features is obtained by keeping 98% of the total component variations. When mRMR is used to reduce the dimensionality of the set of HC features, in one embodiment, the top 160 features are selected. In another embodiment, other techniques to reduce the dimensionality of the HC feature set may be used.

Method 100 also includes, at 142, training the HC classifier using the set of HC features. In one embodiment, training the HC classifier includes reducing the number of non-mitotic nuclei by detecting a clustered set of overlapping nuclei in the candidate mitosis patch. The overlapping non-mitotic nuclei are replaced with the clustered center of the clustered set. The mitotic nuclei are then oversampled by applying a Synthetic Minority Oversampling Technique (SMOTE). Reducing the number of non-mitotic nuclei corrects the classification bias that occurs in conventional systems caused by the relatively small number of mitotic nuclei compared to non-mitotic nuclei.

Method 100 also includes, at 144, generating an HC classification score. Generating the HC classification score includes, in one embodiment, generating an output of a Random Forest classifier. The Random Forest classifier has at least 50 trees. The output of the Random Forest classifier is a probability that the candidate mitosis patch is mitotic. In other embodiments, more than 50 trees or fewer than 50 trees may be employed. Random Forest classifiers with more than 50 trees may cause over fitting, while Random Forest classifiers with fewer than 50 trees may lead to lower classification accuracy. The number of trees may be adjusted to achieve different F-measures. Method 100, at 144, assigns the output of the Random Forest classifier to the HC classification score. Upon determining that the output of the Random Forest classifier is greater than an HC threshold probability, method 100 classifies the HC classification score as mitotic. Upon determining that the output of the Random Forest classifier is less than or equal to the HC threshold probability, method 100 classifies the HC classification score as non-mitotic. In one embodiment, the HC threshold probability is 0.58. In another embodiment, other HC threshold probabilities may be used. The HC threshold probability may be adjusted to achieve different F-measures.

Method 100 also includes, at 150, producing a final classification. The final classification is based, at least in part, on both the CNN classification score and the HC classification score. Producing the final classification includes comparing the CNN classification score with the HC classification score. If the CNN classification score and the HC classification score are both within a threshold range, method 100 produces a final classification based, at least in part, on the CNN classification score and the HC classification score. The final classification score indicates the probability that the candidate mitosis patch is mitotic. In one embodiment, if both the CNN classification score and HC classification score are within a threshold range of (0.58, 1, method 100 produces a final classification score that indicates the candidate mitosis patch is mitotic. Alternately, if both the CNN classification score and the HC classification score are within a threshold range of [0, 0.58], method 100 produces a final classification score that indicates the candidate mitosis patch is non-mitotic. In other embodiments, other threshold ranges may be employed.

Producing the final classification may also include determining that the CNN classification score and the HC classification score are not both within a threshold range. For example, method 100 may, at 150, determine that the HC classification score and the CNN classification score disagree. The HC classification score may, for example, indicate that the candidate mitosis patch is non-mitotic. The HC classifier may have computed a probability of 0.4 that the candidate mitosis patch is mitotic, and assigned that probability to the HC classification score. The CNN classification score may indicate that the candidate mitosis patch is mitotic, the CNN classifier having assigned a probability of 0.61 that the candidate mitosis patch is mitotic to the CNN classification score. In this example upon determining that the CNN classification score and the HC classification score disagree, method 100 trains a cascaded classifier. The cascaded classifier is trained using a stacked set of features. The stacked set of features includes the set of CNN-learned features and the set of HC features. The cascaded classifier generates a cascaded classification score for the candidate mitosis patch. In one embodiment, the cascaded classifier produces a probability that the candidate mitosis patch is mitotic. The final classification may, in this iteration of method 100, be based, at least in part, on a weighted average of the CNN classification score, the HC classification score, and the cascaded classification score. Computing the weighted average of the CNN classification score, the HC classification score, and the cascaded classification score results in a probability from 0 to 1 that the candidate mitosis patch is mitotic. The final classification indicates the probability that the candidate mitosis patch is mitotic.

Method 100 also includes, at 160, controlling an automated nuclei detection system to classify the candidate mitosis patch. The automated nuclei detection system may classify the candidate mitosis patch as mitotic or non-mitotic, based, at least in part, on the final classification. By classifying the candidate mitosis patch as mitotic, the automated nuclei detection system has detected mitosis from among the non-mitotic regions of the image.

Method 100 also includes, at 170, generating a mitotic count. The mitotic count is generated by calculating the total number of mitotic nuclei classified by the automated nuclei detection system at step 160 for the image. The mitotic count may be used for grading the cancer represented in the image.

Method 100 also includes, at 180, controlling an automated cancer grading system to grade the image. The grade of a cancer is representative of the aggressiveness of the cancer. A key component of a cancer grade is the mitotic count. In one embodiment, method 100, at 180, provides the mitotic count generated at step 170 to an automated cancer grading system. The automated cancer grading system generates a cancer grade, based, at least in part, on the mitotic count. HPFs with lower mitotic counts may generate a lower cancer grade, while HPFs with higher mitotic counts may result in a higher cancer grade. In this embodiment, the automated cancer grading system uses a Bloom-Richardson grading approach. Bloom-Richardson grades are based, at least in part, on mitotic count. In a different embodiment, a grading approach other than Bloom-Richardson grading that uses mitotic count may be employed. In another embodiment, a human pathologist may use the mitotic count to manually grade a cancer specimen using a Bloom-Richardson approach, or another approach that employs mitotic count.

Using the features extracted at steps 130 and 140, example methods and apparatus employing a cascaded architecture of CNN and HC features provide faster and more accurate detection of mitotic nuclei than conventional systems. Improved classification and detection of mitotic nuclei may produce the technical effect of improving treatment efficacy and improving doctor efficiency by increasing the accuracy and decreasing the time required to grade a cancer specimen. Treatments and resources may be more accurately tailored to patients with more aggressive cancer so that more appropriate protocols may be employed. Using a more appropriate protocol may lead to less therapeutics being required for a patient or may lead to avoiding or delaying a resection or other invasive procedure.

In one embodiment, method 100 detects cellular mitosis in a region of BCa tissue. In other embodiments, other features may be extracted, and cellular mitosis in regions of other diseases may be detected. For example, cellular mitosis in regions of prostate, or other types of cancer may be detected. Improving detection of cellular mitosis in cancerous regions also produces the technical effect of improving treatment efficacy and improving doctor efficiency. When cellular mitosis is more quickly and more accurately detected, patients most at risk may receive a higher proportion of scarce resources (e.g., therapeutics, physician time and attention, hospital beds) while those less at risk may be spared unnecessary treatment, which in turn spares unnecessary expenditures and resource consumption. Example methods and apparatus may also have the concrete effect of improving patient outcomes.

While FIG. 1 illustrates various actions occurring in serial, it is to be appreciated that various actions illustrated in FIG. 1 could occur substantially in parallel. By way of illustration, a first process could segment candidate mitosis patches in the image, a second process could extract HC features, and a third process could extract CNN-learned features. While three processes are described, it is to be appreciated that a greater or lesser number of processes could be employed and that lightweight processes, regular processes, threads, and other approaches could be employed.

Figure 2:
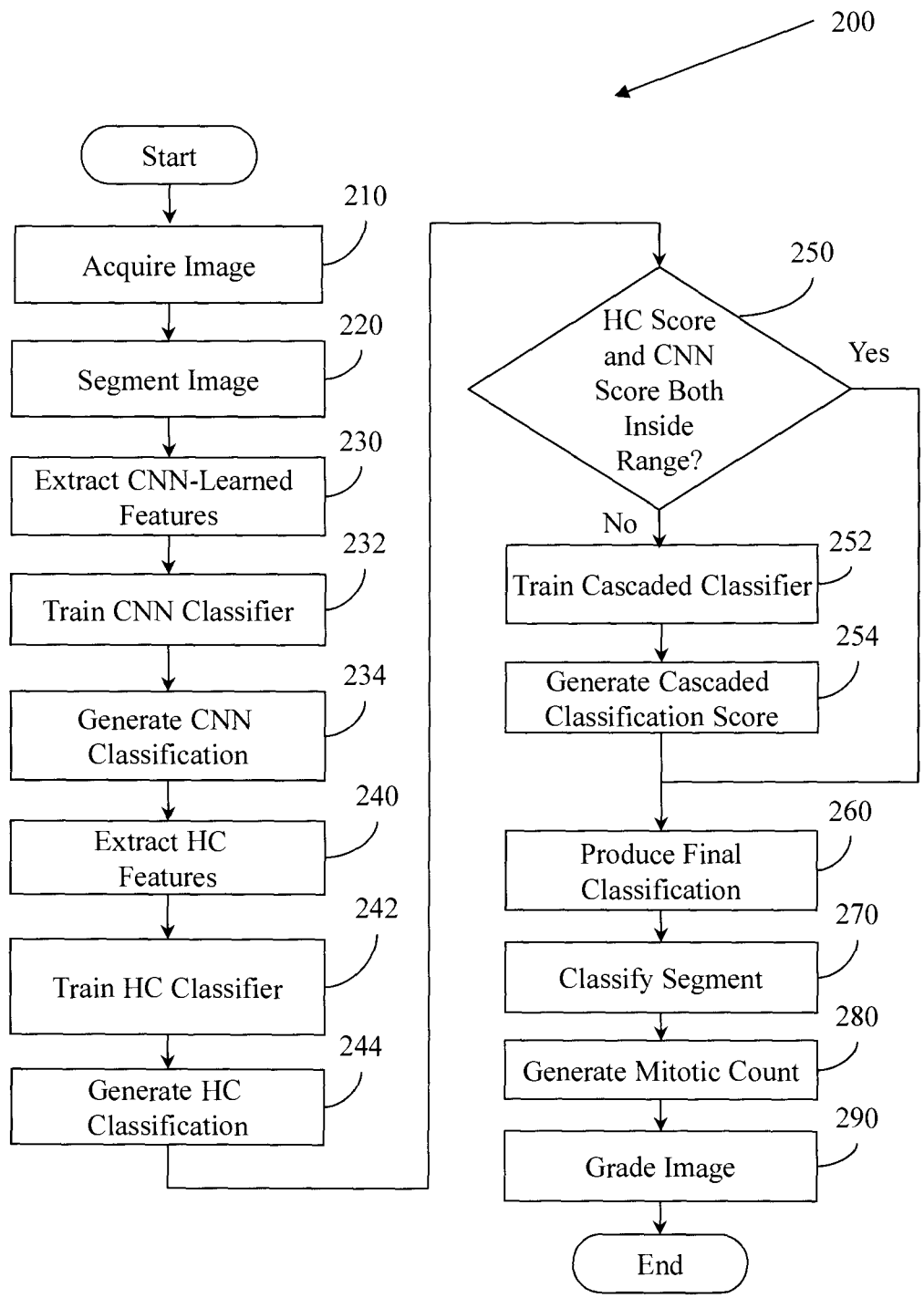
FIG. 2 illustrates an iteration of a method associated with detecting cellular mitosis in a region of cancerous tissue.

FIG. 2 illustrates an iteration of a computerized method 200 that is similar to method 100. FIG. 2 illustrates the cascaded nature of method 100. Method 200 includes, at 210, accessing an image of a region of pathological tissue. Accessing the image may include acquiring electronic data, reading from a computer file, receiving a computer file, reading from a computer memory, or other computerized activity. Method 200 also includes, at 220, segmenting the image into a candidate mitosis patch. In one embodiment, segmenting an image into a candidate mitosis patch includes generating a blue-ratio image by converting the image from RGB color space to a blue-ratio color space, computing a LoG response for the blue-ratio image, and identifying candidate nuclei by integrating globally fixed thresholding and local dynamic thresholding.

Method 200 also includes, at 230, extracting a set of CNN-learned features from the candidate mitosis patch using a CNN. In one embodiment, the CNN is a three-layer CNN including a first convolution-pooling layer, a second convolution-pooling layer, and a fully-connected layer. The first convolution-pooling layer includes a first convolution layer and a first pooling layer. The second convolution-pooling layer includes a second convolution layer and a second pooling layer. The first convolution layer has at least 64 units and the first pooling layer has at least 64 units. The second convolution layer has at least 128 units and the second pooling layer has at least 128 units. The fully-connected layer has at least 256 units. For each layer, a fixed 8×8 convolution kernel and 2×2 pooling kernel are used. The output of the CNN includes two units that accept as input the entire output of the fully-connected layer, and indicate the candidate mitosis patch is mitotic or non-mitotic. In other embodiments, different sized kernels may be used, and the layers may have different numbers of units. Method 200 also includes, at 232, training a CNN classifier using the set of CNN-learned features. Method 200 also includes, at 234, generating a CNN classification score by classifying the candidate mitosis patch with the CNN classifier. The CNN classification score indicates the probability the candidate mitosis patch is mitotic. In one embodiment, the CNN classifier generates a log-likelihood that the candidate mitosis patch is a member of a class (e.g., mitotic, non-mitotic). An exponential function is applied to the log-likelihood to generate a probability that the candidate mitosis patch is mitotic. If the probability exceeds a threshold probability, the CNN classifier classifies the candidate mitosis patch as mitotic. If the probability is equal to or less than the threshold probability, the CNN classifier classifies the candidate mitosis patch as non-mitotic. In one embodiment, the threshold probability is 0.58. In other embodiments, other threshold probabilities may be used.

Method 200 also includes, at 240, extracting a set of HC features from the candidate mitosis patch. The set of HC features includes a set of morphology features, a set of intensity features, or a set of texture features. Method 200 also includes, at 242, training an HC classifier using the set of HC features. Training the HC classifier may include reducing non-mitotic nuclei by replacing overlapping non-mitotic nuclei with their clustered center, oversampling mitotic cells by applying SMOTE, and using an empirically selected threshold of 0.58.

Method 200 also includes, at 244, generating an HC classification score by classifying the candidate mitosis patch using the HC classifier. The HC classification score indicates the probability the candidate mitosis patch is mitotic. In one example, if the probability that the candidate mitosis patch exceeds a threshold probability, the HC classifier classifies the candidate patch as mitotic. If the probability that the candidate mitosis patch is mitotic is equal to or less than the threshold probability, the HC classifier classifies the candidate mitosis patch as non-mitotic. In one embodiment, the threshold probability is 0.58. In other embodiments, other threshold probabilities may be employed.

Method 200 also includes, at 250, comparing the HC classification score and the CNN classification score. If both the CNN classification score and the HC classification score are within a threshold range, then method 200 proceeds to block 260. In one embodiment, upon determining that both the CNN classification score and HC classification score are above the threshold probability, method 200 continues to block 260. Upon determining that both the CNN classification score and the HC classification score are equal to or below the threshold probability, method 200 also continues to block 260. Thus, the CNN classification score and HC classification score may both be within the threshold range (e.g., in agreement) when both the CNN classification score and the HC classification score are above a threshold probability, or when both are equal to or less than the threshold probability.

Upon determining that the CNN classification score and the HC classification score do not agree, method 200 continues to block 252. The CNN classification score and the HC classification score do not agree when one of the CNN classification score or the HC classification score is above the threshold probability, and the other, different classification score is equal to or below the threshold probability. For example, in an embodiment in which the threshold probability is 0.58, a CNN classification score of 0.2 and an HC classification score of 0.9 do not agree. In another embodiment, the CNN classification score may indicate a binary value of mitotic or non-mitotic, instead of or in addition to a probability. Similarly, the HC classification score may also indicate a binary value of mitotic or non-mitotic. In this embodiment, if one of the HC classification score or the CNN classification score indicates mitotic, and the other, different classification score indicates non-mitotic, then the classification scores do not agree, and method 200 proceeds to block 252.

Method 200 includes, at 252, training a cascaded classifier. The cascaded classifier is trained using a stacked set of features. The stacked set of features includes the set of HC features and the set of CNN-learned features. By training the cascaded classifier after detecting confounding image patches, rather than in all cases, example methods and apparatus reduce the amount of computing resources required by conventional methods that employ stacked feature sets. Method 200 also includes, at 254, generating a cascaded classification score. The cascaded classifier generates a cascaded classification score by classifying the candidate mitosis patch. The cascaded classification score indicates the probability that the candidate mitosis patch is mitotic.

Method 200 also includes, at 260, producing a final classification. If both the HC classification score and CNN classification score agree, the final classification is based, at least in part, on the CNN classification score and the HC classification score. If the HC classification score and the CNN classification score do not agree, the final classification is based, at least in part, on a weighted average of the CNN classification score, the HC classification score, and the cascaded classification score. By only training the cascaded classifier and classifying the candidate mitosis patch using the cascaded classifier when the CNN classification score and the HC classification score do not agree, method 200 improves on conventional methods that use a stacked feature set to classify nuclei. Combining the set of HC features and the set of CNN-learned features into the stacked set of features leverages the disconnected feature sets to improve classification accuracy when the individual HC classifier and CNN classifiers are confounded.

Method 200 also includes, at 270, controlling an automated mitotic nuclei detection system to classify the candidate mitosis patch as mitotic or non-mitotic, based, at least in part, on the final classification. Method 200 also includes, at 280, generating a mitotic count by computing the total number of candidate mitosis patches classified as mitotic by the automated mitotic nuclei detection system. Method 200 also includes, at 290, controlling an automated cancer grading system to grade the image. In one embodiment, the automated cancer grading system grades the image using a Bloom-Richardson grade. The Bloom-Richardson grade is based, at least in part, on the mitotic count.

Figure 3:
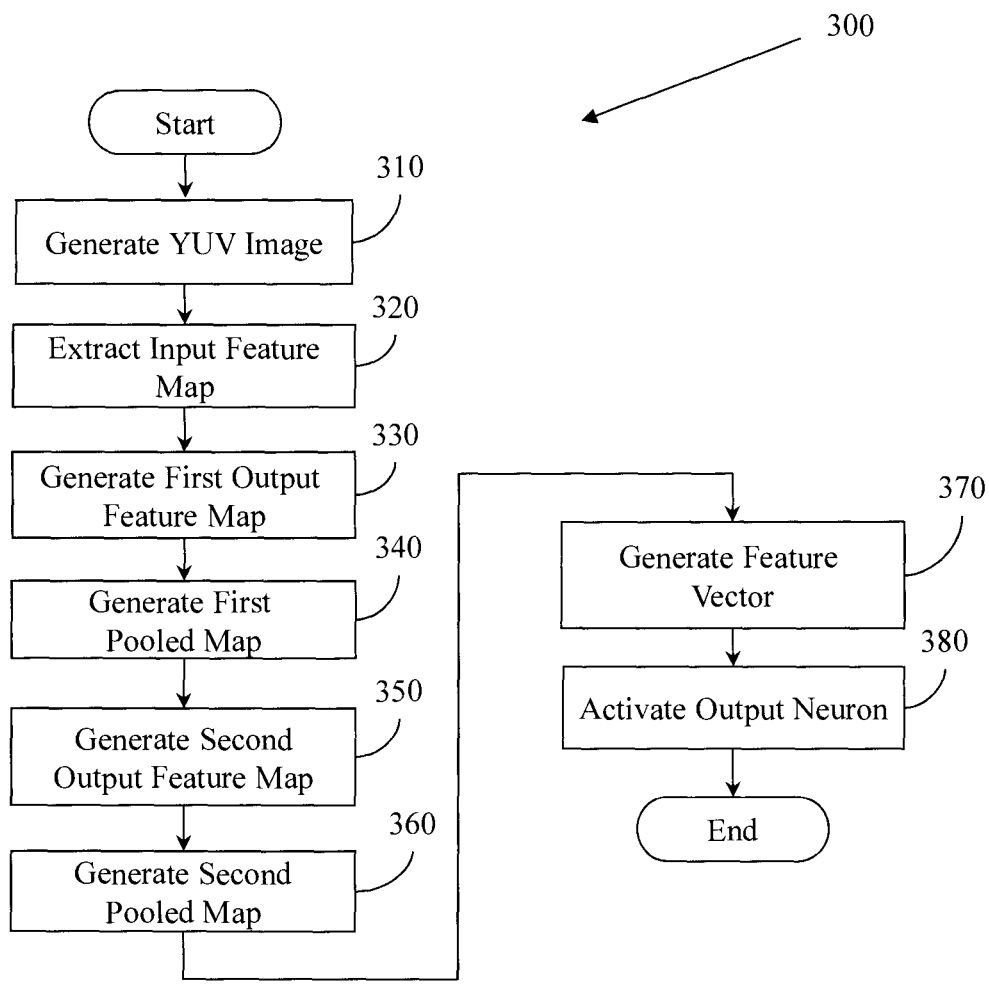
FIG. 3 is a flow chart illustrating the operation of a CNN used in example methods and apparatus.

FIG. 3 is a flow chart illustrating the operation of a light CNN model that may be employed in example methods and apparatus. In one embodiment, the CNN described by FIG. 3 includes 3 layers. The CNN includes a first convolution-pooling layer, a second convolution-pooling layer, and a fully-connected layer. The first convolution-pooling layer includes a first convolution layer that has at least 64 units, and a first pooling layer that has at least 64 units. The second convolution-pooling layer has a second convolution layer that has at least 128 units, and a second pooling layer that has at least 128 units. The fully-connected layer has at least 256 units. In another embodiment, the layers may have different numbers of units.

FIG. 3 includes, at 310, generating a YUV color space image. The YUV color space image is generated by converting the image from RGB color space to YUV color space. The YUV color space image is normalized to a mean of zero and a variance of one. FIG. 3 also includes, at 320, extracting an input feature map from the YUV color space image. The input feature map becomes the input for the first layer of the CNN. FIG. 3 also includes, at 330, generating a first output feature map. The first output feature map is generated by applying, in the first convolution layer of the CNN, a two-dimensional (2D) convolution of the input feature map and a first convolution kernel. In one embodiment, the first convolution kernel is a fixed 8×8 convolutional kernel. The first output feature map becomes the input for the first pooling layer.

FIG. 3 also includes, at 340, generating a first pooled map. The first pooled map is generated by applying, in the first pooling layer in the CNN, an L2 pooling function over a spatial window. The spatial window is applied over the first output feature map. The L2 pooling function is applied without overlapping. An L2 pooling function facilitates optimal learning of invariant features in the spatial window. In one embodiment, a fixed 2×2 pooling kernel is used. The first output feature map becomes the input for the second convolution layer.

FIG. 3 also includes, at 350, generating a second output feature map. The second output feature map is generated by applying, in the second convolution layer of the CNN, a 2D convolution of the first pooled map and a second convolution kernel. The second convolution kernel is a fixed 8×8 convolution kernel. The second output feature map becomes the input for the second pooling layer.

FIG. 3 also includes, at 360, generating a second pooled map in the second pooling layer. The second pooled map is generated by applying an L2 pooling function over a spatial window. The spatial window is applied over the second output feature map. The L2 pooling function is applied without overlapping. In one embodiment, a fixed 2×2 pooling kernel is used. The second pooled map is used as the input for the fully-connected layer.

FIG. 3 also includes, at 370, generating a feature vector. The feature vector is generated by applying the second pooled map to the fully-connected layer of the CNN. FIG. 3 also includes, at 380, generating a fully-connected layer output by activating an output unit in the CNN. In one embodiment, the output of the fully-connected layer is two units. A first unit, when activated, indicates mitosis, and a second, different unit, when activated, indicates non-mitosis.

Example methods and apparatus improve the detection of cellular mitosis in cancerous tissue compared to conventional methods by employing a cascaded approach that uses a lighter CNN than those CNNs used by conventional methods. Lighter CNNs reduce the time and resources required to automatically detect cellular mitosis compared to conventional methods. Example methods and apparatus also leverage disconnected feature sets that are not exploited by conventional methods, which facilitates making more accurate predictions of patient prognosis. Improving patient prognosis prediction facilitates allocating resources, personnel, and therapeutics to appropriate patients while sparing patients from treatment that might have been prescribed with a less accurate prediction.

In one example, a method may be implemented as computer executable instructions. Thus, in one example, a computer-readable storage medium may store computer executable instructions that if executed by a machine (e.g., computer) cause the machine to perform methods described or claimed herein including method 100, method 200, method 300, and method 400. While executable instructions associated with the listed methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

Figure 4:
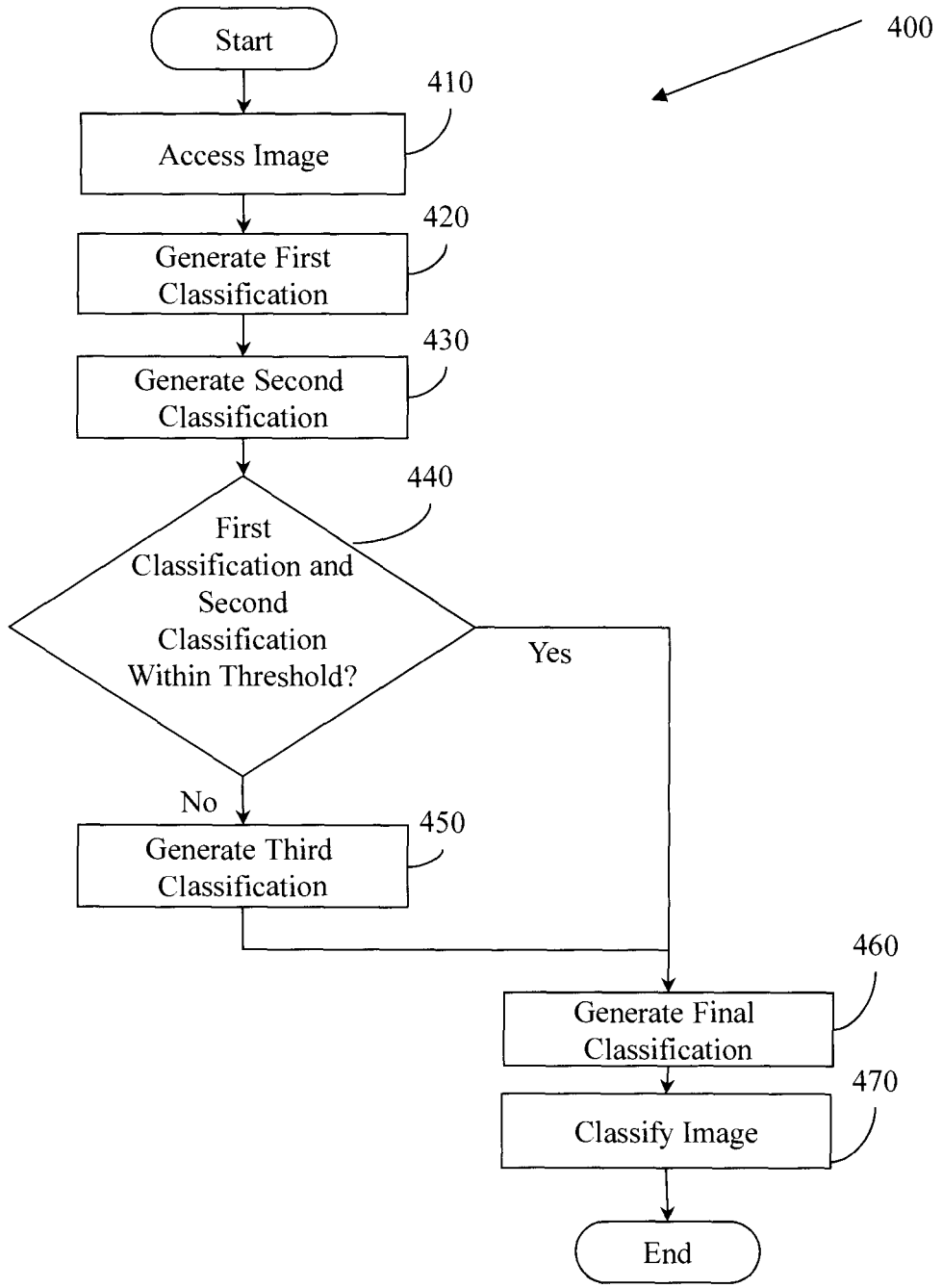
FIG. 4 illustrates an example method of producing a classification of a region of interest.

FIG. 4 illustrates an example method 400 for producing a classification of a region of interest. Method 400 includes, at 410, accessing an image of the region of interest. In one embodiment, the image is a whole slide image (WSI) of a region of invasive ductal carcinoma (IDC) tissue. In another embodiment, the image is an HPF of an H&E stained slide of a region of BCa tissue. In other embodiments, images acquired using other imaging techniques may be accessed.

Method 400 also includes, at 420, generating a first classification for the image. The first classification may be a probability that the image is a member of a class. The first classification is generated by a first classifier trained using a first feature set. In one embodiment, the first classifier is a light CNN that includes three layers. In one embodiment, the first layer includes a first convolution layer and a first pooling layer. The second layer includes a second convolution layer and a second pooling layer. The third layer includes a fully-connected layer. In one embodiment, the first convolution layer and the first pooling layer each have 32 units, the second convolution layer and the second pooling layer each have 64 units, and the fully-connected layer has 128 units. In another embodiment, the first convolution layer and the first pooling layer each have 64 units, the second convolution layer and the second pooling layer each have 128 units, and the fully-connected layer has 256 units. In yet other embodiments, the CNN may include more layers, or the layers may have different numbers of units.

Method 400 also includes, at 430 generating a second classification for the image. The second classification may be a probability that the image is a member of a class. The second classification is generated using a second classifier trained using a second feature set. The second feature set is distinguishable from the first feature set. In one embodiment, the second classifier is a fifty-tree Random Forests classifier and the first feature set is a handcrafted feature set. The first feature set may include a morphology feature subset, an intensity feature subset, or a texture feature subset. In other embodiments, other classifiers may be used, or the first feature set may include other feature subsets.

Method 400 also includes, at 440, determining if the first classification and the second classification are both within a threshold amount. In one embodiment, the first classification and the second classification are within a threshold if the first classification and the second classification both indicate the image is within a first class (e.g., mitotic). The first classification and the second classification may be within a threshold if the first classification and the second classification both indicate the image is not in the first class, but is in a second class (e.g., non-mitotic). Upon determining that the first classification and the second classification are both within a threshold, method 400 produces, at 460 a final classification based, at least in part, on the first classification and the second classification.

Method 400, upon determining at 440 that the first classification and the second classification are not both within threshold amount, proceeds to block 450. For example, method 400 may determine that the first classification indicates membership in the first class and that the second classification indicates membership in the second class. Method 400, at 450, generates a third classification using a third classifier trained using the first feature set and the second feature set. In one embodiment, the third classifier is trained using a stacked feature set that includes the first feature set and the second feature set. The third classification indicates the probability that the image is a member of a class. The dimensionality of the first feature set or the second feature set may be reduced using principal component analysis (PCA) or minimum redundancy maximum relevance (mRMR) feature selection.

Method 400 also includes, at 460, producing a final classification. The final classification indicates the probability that the image is a member of the class. In one embodiment, the final classification is based on a weighted average of the first classification, the second classification, and the third classification. Method 400 also includes, at 470, controlling an automated image classification system to classify the image based, at least in part, on the final classification. In one embodiment, the automated image classification system is an automated mitosis detection system used in grading breast cancer.

Figure 5:
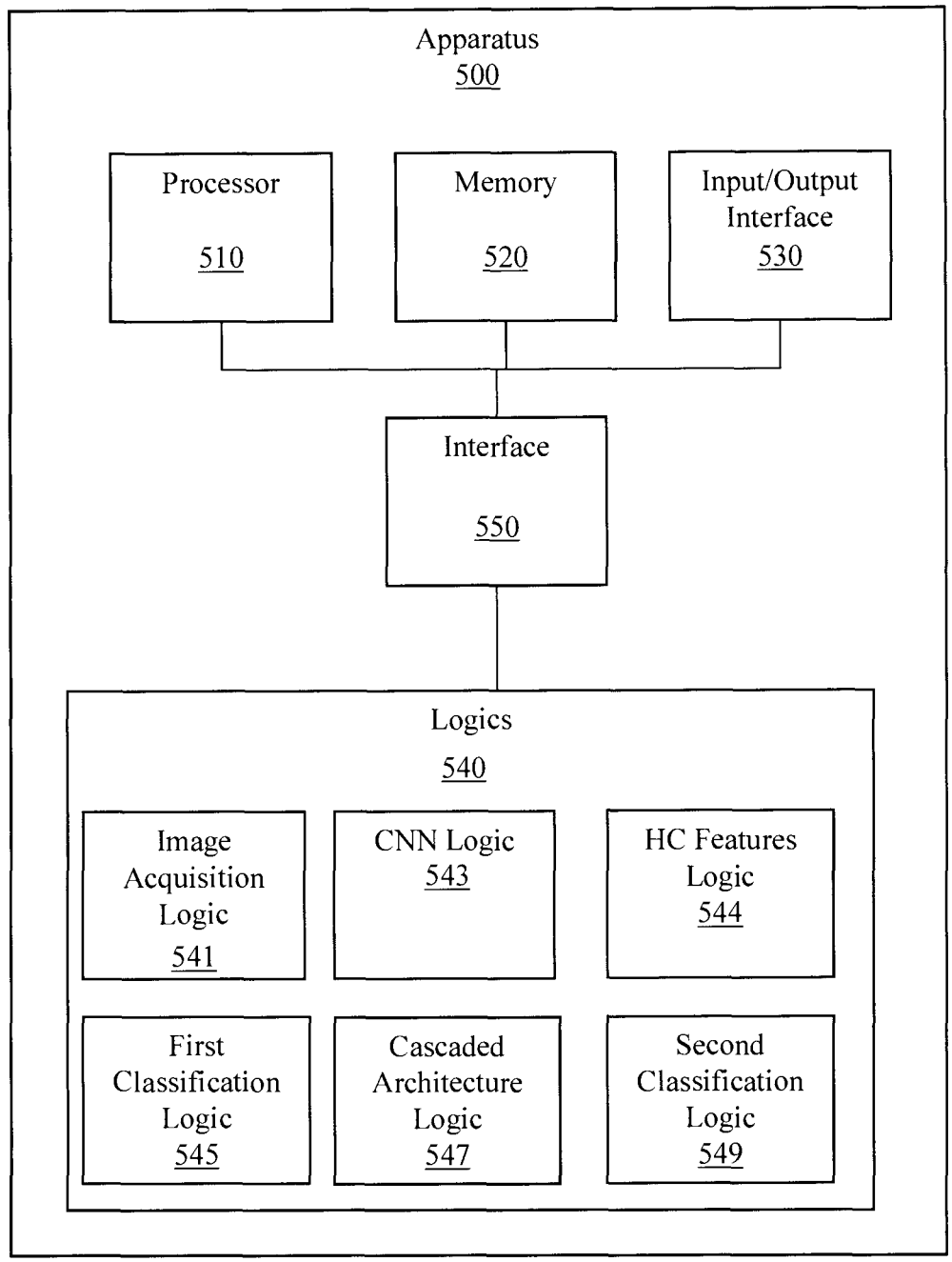
FIG. 5 illustrates an example apparatus that detects mitosis in cancer pathology images.

FIG. 5 illustrates an example apparatus 500 that detects mitosis in cancer pathology images. Apparatus 500 includes a processor 510, a memory 520, an input/output interface 530, a set of logics 540, and an interface 550 that connects the processor 510, the memory 520, the input/output interface 530, and the set of logics 540. The set of logics 540 includes an image acquisition logic 541, a CNN logic 543, an HC features logic 544, a first classification logic 545, a cascaded architecture logic 547, and a second classification logic 549.

Image acquisition logic 541 acquires an image of a region of tissue. The region of tissue may be a section of diseased tissue. The image may be a high-power field (HPF) representing a 512 µm by 512 µm area of the region of tissue. In one embodiment, image acquisition logic 541 acquires a digitally scanned H&E stain image magnified at 400×. The digitally scanned H&E stain image may be provided by an Aperio XT scanner. The Aperio XT scanner has a resolution of 0.2456 µm per pixel and generates a 2084 pixel by 2084 pixel RGB image of the HPF. In another embodiment, images that are made using other scanners, other staining techniques, or different magnification levels may be acquired. For example, the image may be provided by an optical microscope, or an automated slide staining system. Thus, accessing the image may include interacting with a scanning apparatus, an optical microscope, or an automated slide staining system. Other imaging systems may be used to generate and access the image accessed by image acquisition logic 541. Image acquisition logic 541 may segment the image into patches. A patch is smaller than the image.

CNN logic 543 extracts a set of CNN-learned features from a patch of the image. CNN logic 543 generates a first probability that the patch is mitotic, based, at least in part, on the set of CNN-learned features. In one embodiment, CNN logic 543 uses a three layer CNN. The three-layer CNN includes a first convolutional and pooling layer, a second convolution and pooling layer, and a fully-connected layer. The fully-connected layer produces a feature vector. The fully-connected layer outputs a first unit and a second unit that are activated by a logistic regression model, based, at least in part, on the feature vector. The first unit indicates mitosis when activated, and the second unit indicates non-mitosis when activated.

HC features logic 544 extracts a set of HC features from the patch. HC features logic 544 generates a second probability that the patch is mitotic. The second probability is based, at least in part, one the set of HC features. In one embodiment, the set of HC features includes a subset of morphology features, a subset of intensity features, and a subset of texture features.

First classification logic 545 classifies the patch as mitotic when the first probability and the second probability both exceed a threshold probability. First logic 545 classifies the patch as non-mitotic when both the first probability and the second probability do not exceed the threshold probability. First logic 545 classifies the patch as confounding when one of the first probability or the second probability exceeds the threshold probability, and the other, different probability does not exceed the threshold probability.

In one embodiment, when the first classification logic has classified the patch as confounding, cascaded architecture logic 547 generates a third probability that the patch is mitotic. The third classification is based, at least in part, on a stacked set of features. The stacked set of features includes the set of CNN-learned features and the set of HC features.

Second classification 549 generates a fourth probability that the patch is mitotic. The fourth probability is based, at least in part, on a weighted average of the first probability, the second probability, and the third probability. In one embodiment, second classification logic 549 classifies the patch as mitotic when the weighted average is greater than the threshold and classifies the patch as non-mitotic when the weighted average is less than or equal to the threshold probability. In one embodiment, the threshold probability is 0.58. In another embodiment, second classification logic 549 may control a computer aided diagnosis (CADx) system to classify the image. For example, second classification logic 549 may control a computer aided breast cancer diagnostic system to grade the image based, at least in part, on the fourth probability. In other embodiments, other types of CADx systems may be controlled, including CADx systems for grading colon cancer, lung cancer, bone metastases, prostate cancer, and other diseases that are graded, at least in part, using mitotic count. Second classification logic 549 may control the CADx system to display the grade on a computer monitor, a smartphone display, a tablet display, or other displays. Displaying the grade may also include printing the grade. Second classification logic 549 may also control the CADx to display an image of the detected mitotic nuclei.

Figure 6:
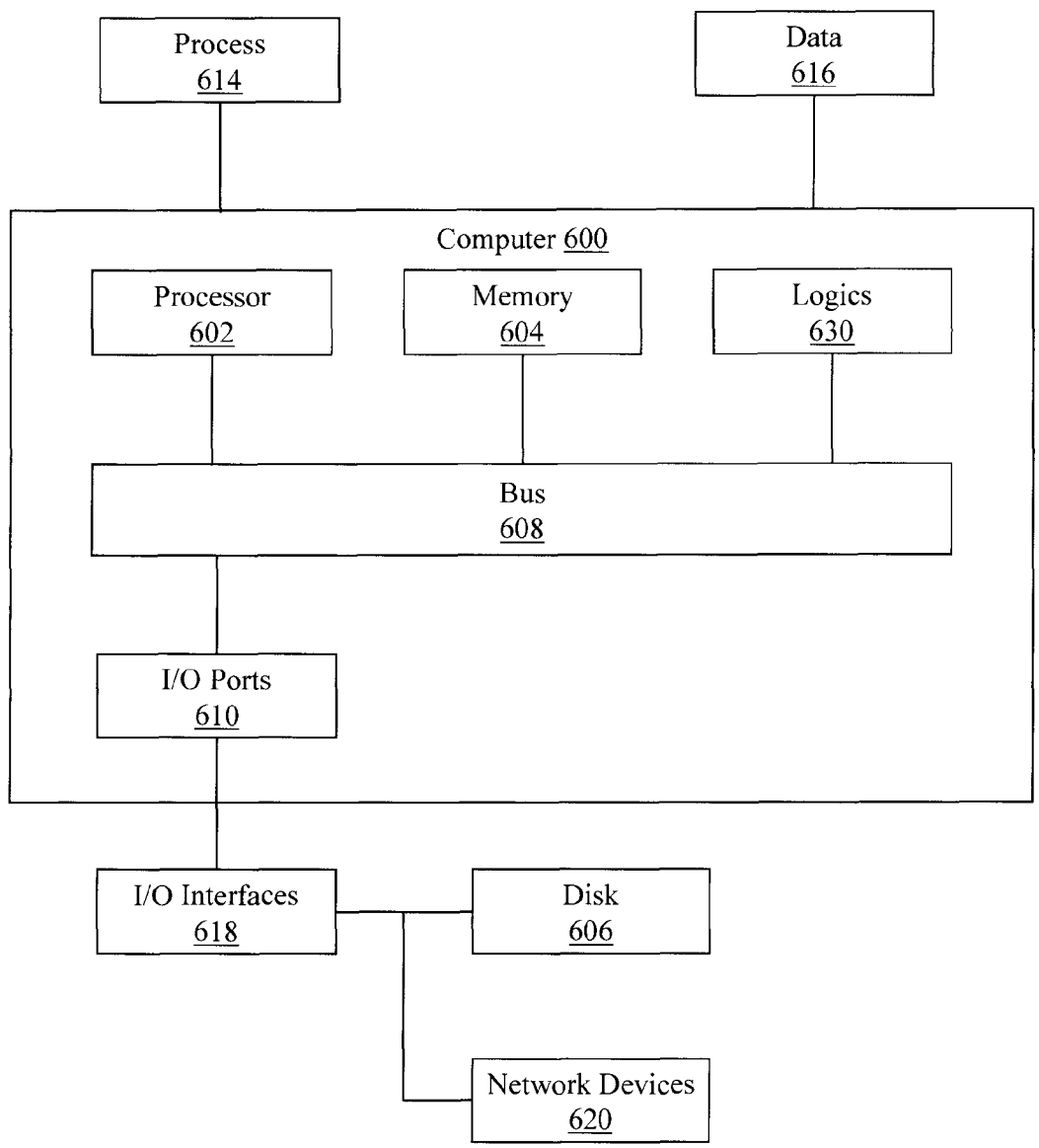
FIG. 6 illustrates an example computer in which example methods and apparatus described herein operate.

FIG. 6 illustrates an example computer 600 in which example methods illustrated herein can operate and in which example logics may be implemented. In different examples computer 600 may be part of a digital whole slide scanner, may be operably connectable to a digital whole slide scanner, may be part of a microscope, may be operably connected to a microscope, or may be part of a CADx system.

Computer 600 includes a processor 602, a memory 604, and input/output ports 610 operably connected by a bus 608. In one example, computer 600 may include a set of logics 630 that perform a method of detecting cellular mitosis in a region of cancerous tissue using a cascaded approach to intelligently combining handcrafted features with convolutional neural networks. Thus, the set of logics 630, whether implemented in computer 600 as hardware, firmware, software, and/or a combination thereof may provide means (e.g., hardware, software) for detecting cellular mitosis in a region of cancerous tissue using HC features and CNN-learned features. In different examples, the set of logics 630 may be permanently and/or removably attached to computer 600.

Processor 602 can be a variety of various processors including dual microprocessor and other multi-processor architectures. Memory 604 can include volatile memory and/or non-volatile memory. A disk 606 may be operably connected to computer 600 via, for example, an input/output interface (e.g., card, device) 618 and an input/output port 610. Disk 606 may include, but is not limited to, devices like a magnetic disk drive, a tape drive, a Zip drive, a flash memory card, or a memory stick. Furthermore, disk 606 may include optical drives like a CD-ROM or a digital video ROM drive (DVD ROM). Memory 604 can store processes 614 or data 616, for example. Disk 606 or memory 604 can store an operating system that controls and allocates resources of computer 600.

Bus 608 can be a single internal bus interconnect architecture or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet).

Computer 600 may interact with input/output devices via I/O interfaces 618 and input/output ports 610. Input/output devices can include, but are not limited to, digital whole slide scanners, an optical microscope, a keyboard, a microphone, a pointing and selection device, cameras, video cards, displays, disk 606, network devices 620, or other devices. Input/output ports 610 can include but are not limited to, serial ports, parallel ports, or USB ports.

Computer 600 may operate in a network environment and thus may be connected to network devices 620 via I/O interfaces 618 or I/O ports 610. Through the network devices 620, computer 600 may interact with a network. Through the network, computer 600 may be logically connected to remote computers. The networks with which computer 600 may interact include, but are not limited to, a local area network (LAN), a wide area network (WAN), or other networks.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage medium storing computer-executable instructions that when executed by a computer control the computer to perform a method for detecting cellular mitosis in a region of cancerous tissue, the method comprising:
    acquiring an image of cancerous tissue;
    segmenting the image into a candidate mitosis patch;
    extracting a set of convolutional neural network (CNN) learned features from the candidate mitosis patch using a CNN;
    training a CNN classifier using the set of CNN-learned features;
    generating a CNN classification score by classifying the candidate mitosis patch with the CNN classifier;
    extracting a set of hand-crafted (HC) features from the candidate mitosis patch;
    training an HC classifier using the set of HC features;
    generating an HC classification score by classifying the candidate mitosis patch with the HC classifier;
    producing a final classification based, at least in part, on both the CNN classification score and the HC classification score;
    controlling an automated mitotic nuclei detection system to classify the candidate mitosis patch as mitotic or non-mitotic based on the final classification;
    generating a mitotic count by summing the number of candidate mitosis patches classified as mitotic by the automated mitotic nuclei detection system; and
    controlling an automated cancer grading system to grade the image using a Bloom-Richardson grade, where the Bloom-Richardson grade is based, at least in part, on the mitotic count, where producing the final classification comprises:
        comparing the CNN classification score to the HC classification score, and
        upon determining that the CNN classification score and the HC classification score are not within a threshold range:
            training a cascaded classifier using a stacked set of features, where the stacked set of features comprises the set of CNN-learned features and the set of HC features;
            generating a cascaded classification score by classifying the candidate mitosis patch with the cascaded classifier, and
            producing a final classification, based, at least in part, on a weighted average of the CNN classification score, the HC classification score, and the cascaded classification score, where the final classification indicates the probability that the mitosis patch is mitotic.

2. The non-transitory computer-readable storage medium of claim 1, where producing the final classification comprises:
    comparing the CNN classification score to the HC classification score, and
    upon determining that the CNN classification score and the HC classification score are within a threshold range:
        producing a final classification, based, at least in part, on the CNN classification score and the HC classification score, where the final classification indicates the probability that the mitosis patch is mitotic.

3. The non-transitory computer-readable storage medium of claim 1, where acquiring the image comprises scanning an image from a high power field (HPF) of a hematoxylin and eosin (H&E) stained tissue slide, where the HPF represents at least a 512×512 µm region of tissue, where the HPF is acquired using a slide scanner and a multi-spectral microscope, where the image is a RGB color space image, and where the image has dimensions of at least 2084 pixels×2084 pixels.

4. The non-transitory computer-readable storage medium of claim 3, where segmenting the image into a candidate mitosis patch comprises:
    generating a blue-ratio image by converting the image from RBG color space to a blue-ratio color space;
    computing a Laplacian of Gaussian (LoG) response for the blue-ratio image, and
    identifying a candidate nuclei by integrating globally fixed thresholding and local dynamic thresholding.

5. The non-transitory computer-readable storage medium of claim 4, where the CNN comprises:
    a first convolutional layer that has at least P units, P being a number;
    a first pooling layer connected to the first convolutional layer, where the first pooling layer has at least Q units, Q being a number;
    a second convolutional layer connected to the first pooling layer, where the second convolutional layer has at least X units, X being a number greater than P and greater than Q;
    a second pooling layer connected to the second convolutional layer, where the second pooling layer has Y units, Y being a number greater than P and greater than Q;
    a fully-connected layer connected to the second pooling layer, where the fully-connected layer has Z units, Z being a number greater than Y and greater than X, and
    an output layer connected to the fully-connected layer, where the output layer has at least two output units.

6. The non-transitory computer-readable storage medium of claim 5, where P is at least 64, where Q is at least 64, where X is at least 128, where Y is at least 128, and where Z is at least 256.

7. The non-transitory computer-readable storage medium of claim 6, where extracting the set of CNN learned features from the candidate mitosis patch comprises:
    generating a YUV color space image by converting the image from RGB color space to YUV color space and by normalizing the YUV color space image to a mean of zero and a variance of one;
    extracting an input feature map from the YUV color space image;
    generating a first output feature map by applying, in the first convolution layer of the CNN, a two dimensional (2D) convolution of the input feature map and a first convolution kernel;
    generating a first pooled map by applying, in the first pooling layer in the CNN, an L2 pooling function over a spatial window applied over the first output feature map, where the L2 pooling function is applied without overlapping;
    generating a second output feature map by applying, in the second convolution layer of the CNN, a 2D convolution of the first pooled map and a second convolution kernel;

generating a second pooled map by applying, in the second pooling layer of the CNN, an L2 pooling function over a spatial window applied over the second output feature map, where the L2 pooling function is applied without overlapping;

generating a feature vector by applying the second pooled map to the fully-connected layer of the CNN, and generating a fully-connected layer output by activating an output unit in the CNN based, at least in part, on a logistic regression model and the feature vector, where the output unit is one of a mitosis unit or a non-mitosis unit.

8. The non-transitory computer-readable storage medium of claim 7, where training the CNN classifier using the set of CNN-learned features comprises:

generating a rotated mitosis patch by rotating the candidate mitosis patch;

generating a mirrored mitosis patch by mirroring the candidate mitosis patch, and computing a log-likelihood that the candidate mitosis patch is mitotic, where computing the log-likelihood comprises minimizing a loss function by training the CNN classifier using the rotated mitosis patch, the mirrored mitosis patch, and the candidate mitosis patch using a Stochastic Gradient Descent, where the loss function is described by:

$$L(x) = -\log\left[\frac{e^{x_i}}{\sum_j e^{x_j}}\right],$$

where $x_i$ corresponds to the fully-connected layer output multiplied by a logistic model parameter.

9. The non-transitory computer-readable storage medium of claim 8, where generating the CNN classification score by classifying the candidate mitosis patch with the CNN classifier comprises:

computing the probability that the candidate mitosis patch is mitotic by applying an exponential function to the log-likelihood that the candidate mitosis patch is mitotic, where the probability that the candidate mitosis patch is mitotic is a real number between 0 and 1;

assigning the probability that the candidate mitosis patch is mitotic to the CNN classification score;

upon determining that the probability that the candidate mitosis patch is mitotic is greater than a CNN threshold probability, where the CNN threshold probability is at least 0.58, classifying the CNN classification score as mitotic, and upon determining that the probability that the candidate mitosis patch is mitotic is less than or equal to the CNN threshold probability, classifying the CNN classification score as non-mitotic.

10. The non-transitory computer-readable storage medium of claim 1, where extracting the set of HC features from the candidate mitosis patch comprises:

extracting a set of morphology features from the candidate mitosis patch;

extracting a set of intensity features from the candidate mitosis patch, and extracting a set of texture features from the candidate mitosis patch.

11. The non-transitory computer-readable storage medium of claim 10 where the set of morphology features includes area, eccentricity, equivalent diameter, Euler number, extent, perimeter, solidity, major axis length, minor axis length, area overlap ratio, average radial ratio, compactness, Hausdorff dimension, smoothness, or standard distance ratio.

12. The non-transitory computer-readable storage medium of claim 11, the method comprising generating a binary mask by applying blue-ratio thresholding and local non-maximum suppression to the candidate mitosis patch and extracting the set of morphology features from the binary mask of the candidate mitosis patch.

13. The non-transitory computer-readable storage medium of claim 12, the method comprising extracting the set of intensity features from a set of channels of the candidate mitosis patch, the set of channels including a blue-ratio channel, a red channel, a blue channel, a green channel, an L channel in LAB color space, a V channel in CIE 1976 (L*, u*, v*) (LUV) color space, or an L channel in LUV color space, and where the set of intensity features includes mean intensity, median intensity, variance, maximum/minimum ratio, range, interquartile range, kurtosis, or skewness.

14. The non-transitory computer-readable storage medium of claim 13, the method comprising extracting the set of texture features from a set of channels of the candidate mitosis patch, the set of channels including a blue-ratio channel, a red channel, a blue channel, a green channel, an L channel in LAB color space, a V channel in CIE 1976 (L*, u*, v*) (LUV) color space, or an L channel in LUV color space, where the set of texture features includes a subset of concurrence features and a subset of run-length features, where the subset of concurrence features includes the mean and standard deviation of 13 Haralick gray-level concurrence features obtained from the candidate mitosis patch at four orientations, and where the subset of run-length features includes the mean and standard deviation of a set of gray-level run-length matrices, where the set of gray-level run-length matrices correspond to four orientations.

15. The non-transitory computer-readable storage medium of claim 14, the method comprising:

reducing the dimensionality of the set of HC features, where the dimensionality of the set of HC features is reduced using principal component analysis (PCA) or minimum redundancy maximum relevance (mRMR) feature selection, and selecting an optimum set of HC features.

16. The non-transitory computer-readable storage medium of claim 15, where the optimum set of HC features comprises 98% of the component variations or the top 160 features selected using mRMR feature selection.

17. The non-transitory computer-readable storage medium of claim 15, where training the HC classifier using the set of HC features comprises;

reducing the number of non-mitotic nuclei by detecting a clustered center of overlapping nuclei;

replacing the overlapping non-mitotic nuclei with the clustered center, and oversampling mitotic nuclei by applying a Synthetic Minority Oversampling Technique (SMOTE).

18. The non-transitory computer-readable storage medium of claim 17, where generating the HC classification score comprises;

generating an output of a Random Forest classifier, where the Random Forest classifier has at least 50 trees, where the output is a probability that the candidate mitosis patch is mitotic;

assigning the output of the Random Forest classifier to the HC classification score;

upon determining that the output of the Random Forest classifier is greater than an HC threshold probability, where the HC threshold probability is at least 0.58, classifying the HC classification score as mitotic, and upon determining that the output of the Random Forest classifier is less than or equal to the HC threshold probability, classifying the HC classification score as non-mitotic.

19. A non-transitory computer-readable storage medium storing computer-executable instructions that when executed by a computer control the computer to perform a method for producing a classification of a region of interest, the method comprising:

accessing an image of the region of interest;

generating a first classification for the image using a first classifier trained using a first feature set, where the first classifier is a light convolutional neural network (CNN);

generating a second classification for the image using a second classifier trained using a second feature set, where the second feature set is distinguishable from the first feature set, and where the second feature set is a hand-crafted (HC) feature set;

upon determining that the first classification and the second classification are within a threshold amount, producing a final classification for the image based, at least in part, on the first classification and the second classification;

upon determining that the first classification and the second classification are not within the threshold amount, generating a third classification for the image using a third classifier trained using the first feature set and the second feature set, and producing the final classification for the image based, at least in part, on a weighted average of the first classification, the second classification, and the third classification, and controlling an automated image classification system to classify the image based on the final classification.

20. An apparatus for detecting mitosis in cancer pathology images, comprising:
a processor;
a memory;
an input/output interface;
a set of logics; and
an interface to connect the processor, the memory, the input/output interface and the set of logics, the set of logics comprising:

an image acquisition logic that acquires an image of a region of tissue;

a convolutional neural network (CNN) logic that extracts a set of CNN-learned features from a patch of the image and generates a first probability that the patch is mitotic, based, at least in part, on the set of CNN-learned features, where the patch of the image is smaller than the image;

a hand-crafted (HC) features logic that extracts a set of HC features from the patch and generates a second probability that the patch is mitotic, based, at least in part, on the set of HC features;

a first classification logic that classifies the patch as mitotic when the first probability and the second probability are both greater than a threshold probability, classifies the patch as non-mitotic when the first probability and the second probability are both less than or equal to the threshold probability, and classifies the patch as confounding when one of the first probability or the second probability is greater than the threshold probability and the other, different probability is less than or equal to the threshold probability;

a cascaded architecture logic that generates a third probability that the patch is mitotic when the first classification logic classified the patch as confounding, and generates the third probability that the patch is mitotic based, at least in part, on a stacked set of features, where the stacked set of features includes the set of CNN-learned features and the set of HC features, and a second classification logic that generates a fourth probability that the patch is mitotic based, at least in part, on a weighted average of the first probability, the second probability, and the third probability, where the second classification logic classifies the patch as mitotic when the weighted average is greater than the threshold probability, and classifies the patch as non-mitotic when the weighted average is less than or equal to the threshold probability.

* * * * *